3,022,179
CERAMIC MATERIAL AND METHOD OF
MAKING THE SAME
William J. Morrissey, Pittsfield, Mass., assignor to General Electric Company, a corporation of New York
No Drawing. Filed Sept. 23, 1959, Ser. No. 841,678
4 Claims. (Cl. 106—39)

The present invention relates to the preparation of ceramic products, and more particularly to an improved process for making crystalline ceramic products of high mechanical strength and good electrical properties.

Ceramic materials such as porcelain, alumina, and the like have been found advantageous for use as electrical insulating material where high strength coupled with good electrical insulating properties are desirable. A difficulty in the use of the known materials of this type, however, has been the relatively complicated and expensive processes necessary to fabricate such materials in the desired product configuration. Such processes normally entail the use of elevated firing temperatures and extremely high molding pressure to properly compact and harden the material and mold it in the desired shape. While glass-forming mixtures have been readily formed into insulating products of desired shape by simple casting techniques, such a procedure is not effective or practical with porcelain or other known ceramic type compositions. For one thing, the ceramic compositions would require extremely high temperatures, e.g., of the order of 1800° C., to make them sufficiently fluid for casting purposes. A further difficulty is that such compositions, even if made sufficiently molten for casting, would tend to crystallize immediately upon being poured into a mold, giving rise to a process of devitrification which is difficult to control. The usual effect of such rapid crystallization or devitrification is the formation of crystals which are relatively large and non-uniform in size, and consequently the mechanical and electrical qualities of the final ceramic product are much less favorable than those obtained in products composed of small, uniformly sized, compactly arranged crystals.

It is an object of the present invention to provide hard, dense, ceramic products having high mechanical strength and good electrical properties by a simplified process which avoids the above disadvantages of the known methods for making ceramic products.

It is another object of the invention to provide a method of making ceramic products of the above type which is simple and economical, and is readily carried out to produce ceramic products of any desired configuration.

It is still another object of the invention to provide a composition of material which is adapted to produce ceramic products by simple casting techniques.

It is a further object of the invention to provide a barium ceramic body which is adapted to be made by the above-described process.

The above objects and others which will be apparent from the following description and appended claims, are attained in accordance with the invention by forming a melt of a composition comprising MgO, SiO$_2$, BaO, and a fluxing agent, in proper proportions as hereinafter more fully described, cooling the melt to arrest the formation of crystals therein and forming thereby an amorphous, vitreous material, and thereafter heating the thus formed vitreous material for converting it to a micro-crystalline barium ceramic body composed predominantly of a homogeneous mass of minute, randomly oriented crystals.

In accordance with the present invention, it is unnecessary to incorporate a nucleating agent in the molten composition to induce the nucleation or growth of crystals during the subsequent thermal treatment of the vitreous material. The composition ingredients and proportions thereof are such that a metastable glass material is initially formed, which requires only a small amount of energy, supplied by the thermal treatment, to be converted from an amorphous, vitreous phase to a crystalline ceramic phase by a process of auto-crystallization.

The invention is further significant in that the composition employed does not, after being cast, tend to rapidly crystallize or devitrify under ordinary cooling procedures as is characteristic of known types of ceramic-forming compositions, and elaborate procedures to avoid uncontrolled devitrification are therefore unnecessary.

The composition of the barium ceramic material produced in accordance with the invention is as follows, the approximate ranges of the constituent amounts being in percent by weight:

| | Percent |
|---|---|
| MgO | 3–35 |
| SiO$_2$ | 25–50 |
| BaO | 3–35 |
| Fluxing agent | 10–35 |

As used herein, "fluxing agents" is intended to mean glass modifiers which can improve the glass properties or the properties of the final product, or which can improve the melting characteristics of the glass compositions, as well understood in the art.

Fluxing agents which may be suitably used in the above composition include, but are not limited to, MgF$_2$, B$_2$O$_3$, Al$_2$O$_3$, Li$_2$O, Na$_2$O, K$_2$O, K$_2$SiF$_6$ and Al$_2$(SiF$_6$)$_3$, and combinations thereof.

The following are examples of compositions which have produced satisfactory results in accordance with the invention, it being understood that the following specific compositions are given for illustration only and are not intended to limit the scope of the invention.

*Example I*

| Batch Material | Batch, Percent | Product Material | Product, Percent |
|---|---|---|---|
| Magnesium Oxide | 22.2 | MgO | 25.0 |
| Barium Carbonate | 11.4 | BaO | 10.0 |
| Magnesium Fluoride | 6.2 | MgF$_2$ | 7.0 |
| Lithium Carbonate | 6.5 | Li$_2$O | 3.0 |
| Flint | 19.5 | SiO$_2$ | 40.0 |
| Kaolin | 34.2 | Al$_2$O$_3$ | 15.0 |

The above composition produced a pale brown, hard, dense ceramic body and had a melting temperature of about 1375° C. The initial crystallization temperature was about 800° C. and the optimum crystal growth temperature was 1050° C. In the above composition 18% SiO$_2$ was derived from the kaolin.

*Example II*

| Batch Material | Batch, Percent | Product Material | Product, Percent |
|---|---|---|---|
| Magnesium Oxide | 3.5 | MgO | 4.1 |
| Barium Carbonate | 34.1 | BaO | 30.8 |
| Magnesium Fluoride | 16.1 | MgF$_2$ | 18.8 |
| Lithium Carbonate | 6.4 | Li$_2$O | 3.0 |
| Kaolin | 19.2 | Al$_2$O$_3$ | 8.8 |
| Flint | 20.7 | SiO$_2$ | 34.5 |

The above composition, which had a melting point of about 1350° C., yielded a white, hard, dense barium ceramic body. The initial crystallization temperature was about 850° C. and the optimum crystal growth temperature was about 1050° C. In the above composition 10.2% SiO$_2$ was derived from the kaolin.

Example III

| Batch Material | Batch, Percent | Product Material | Product, Percent |
|---|---|---|---|
| Magnesium Oxide | 13.0 | MgO | 15.0 |
| Flint | 19.3 | $SiO_2$ | 40.0 |
| Barium Carbonate | 22.4 | BaO | 20.0 |
| Magnesium Fluoride | 6.0 | $MgF_2$ | 7.0 |
| Lithium Carbonate | 6.4 | $Li_2O$ | 3.0 |
| Kaolin | 32.9 | $Al_2O_3$ | 15.0 |

The above composition had a melting point of about 1375° C. and yielded a pale brown, hard ceramic body. The initial crystallization temperature was 850° C., and an optimum crystal growth temperature of 1050° C. In this composition 17.7% $SiO_2$ was derived from the kaolin.

Example IV

| Batch Material | Batch, Percent | Product Material | Product, Percent |
|---|---|---|---|
| Magnesium Oxide | 21.7 | MgO | 24.0 |
| Flint | 20.1 | $SiO_2$ | 39.0 |
| Barium Carbonate | 10.5 | BaO | 9.0 |
| Magnesium Fluoride | 10.8 | $MgF_2$ | 12.0 |
| Kaolin | 32.5 | $Al_2O_3$ | 14.0 |
| Lithium Carbonate | 4.4 | $Li_2O$ | 2.0 |

This composition had a melting temperature of 1400° C. and a brown, dense ceramic product was obtained. The crystal growth temperatures were substantially the same as those of the preceding example. In this composition, the kaolin contributed 16.7% $SiO_2$.

Example V

| Batch Material | Batch, Percent | Product Material | Product, Percent |
|---|---|---|---|
| Magnesium Oxide | 27.1 | MgO | 30.0 |
| Flint | 20.1 | $SiO_2$ | 39.0 |
| Barium Carbonate | 10.5 | BaO | 9.0 |
| Magnesium Fluoride | 5.4 | $MgF_2$ | 6.0 |
| Kaolin | 32.5 | $Al_2O_3$ | 14.0 |
| Lithium Carbonate | 4.4 | $Li_2O$ | 2.0 |

The melting temperature of the above composition was 1425° C. and a brown, hard ceramic product was obtained. The initial crystallization temperature was about 950° C. and the optimum growth temperature was about 1050° C. The kaolin in this composition yielded 16.7% $SiO_2$.

Example VI

| Batch Material | Batch, Percent | Product Material | Product, Percent |
|---|---|---|---|
| Magnesium Oxide | 23.0 | MgO | 26.0 |
| Flint | 19.3 | $SiO_2$ | 41.0 |
| Barium Carbonate | 5.5 | BaO | 5.0 |
| Magnesium Fluoride | 7.1 | $MgF_2$ | 8.0 |
| Lithium Carbonate | 8.8 | $Li_2O$ | 4.0 |
| Kaolin | 36.3 | $Al_2O_3$ | 16.0 |

The above composition had a melting temperature of about 1400° C. and a brown ceramic product was obtained. The initial crystallization growth temperature was about 850° C. and the optimum growth temperature was about 1050° C. In this composition, 19.2% $SiO_2$ was obtained from the kaolin.

Example VII

| Batch Material | Batch, Percent | Product Material | Product, Percent |
|---|---|---|---|
| Magnesium Oxide | 24.0 | MgO | 25.4 |
| Flint | 44.0 | $SiO_2$ | 46.5 |
| Barium Carbonate | 20.0 | BaO | 16.4 |
| Magnesium Fluoride | 10.0 | $MgF_2$ | 10.6 |
| Boric Acid | 2.0 | $B_2O_3$ | 1.1 |

The melting temperature of the above composition was 1400° C. and an off-white ceramic body was produced. The initial crystal growth temperature was 850° C. and the optimum growth temperature was about 1050° C.

It will be understood that the oxides contained in the products of the above examples may be introduced as pure compounds or as minerals containing two or more of the oxides. For example, as already indicated, the kaolin shown above may be used for introducing both $Al_2O_3$ and part of the $SiO_2$. Talc may be used to yield both MgO and $SiO_2$, and mullite may be used to yield both $Al_2O_3$ and $SiO_2$. Many other types of minerals could be used to provide the necessary oxide components.

Tests made on typical products obtained by the compositions and process of the invention showed that their mechanical strength and electrical properties were, in general, at least equivalent, and in some cases superior to that of high grade electrical porcelain. Of particular significance is the excellent electrical properties of the described product and the marked thermal stability as shown by the electrical resistance properties at temperatures up to even 500° C.

The following illustrates the resistance values, in megohms, under high and low voltages at different temperatures obtained from a typical recrystallized barium ceramic product of the present invention, this product being prepared from the composition of Example I:

| Temperature | Resistance, Megohms at 85 v. D.C. | Resistance, Meghoms at 500 v. D.C. |
|---|---|---|
| 30° C | $20 \times 10^5$ | $15 \times 10^5$ |
| 100° C | $20 \times 10^5$ | $20 \times 10^5$ |
| 200° C | $3.5 \times 10^4$ | $4.5 \times 10^4$ |
| 300° C | $1.5 \times 10^2$ | $2 \times 10^2$ |
| 400° C | $0.9 \times 10$ | 1.3 |
| 500° C | $3.5 \times 1$ | 0.38 |

X-ray diffraction analysis made of the products of the present invention indicates that the ceramic material is composed of a micro-crystalline mass containing barium as a component of the crystal structure. However, the pattern for these crystals was not indentifiable in terms of known crystalline material and its exact crystal structure is not known. The crystals appear, in an examination by a reflected light microscopy, to be platy, but somewhat needlelike radiating from common centers forming clusters in a very fine matrix.

The following is a typical process for making the ceramic material of the invention and is applicable in particular to the composition of Example I, it being understood that variations may be made in the specific procedure and values set forth herein without departing from the inventive concept.

The raw materials of the batch composition, finely divided by a ball mill or the like, are mixed in the proper proportions and melted in an electric furnace at a temperature in the vicinity of 1300° C. A centrifugal steel mold is prepared for producing a bushing configuration of the melt, and the necessary metal hardware is placed in the mold for embedding in the final product. With the mold pre-heated to a temperature of about 200–300° C. the molten batch composition is poured therein to a predetermined level. The casting temperature of the molten material at this stage was about 1375° C. The mold containing the molten material therein is spun about its axis so that the molten contents take on the configuration of the mold. The material is allowed to cool in the mold to below the annealing temperature, e.g., about 700° C., that is to say, to a temperature at which the molten material becomes sufficiently solidified to prevent its slumping in the mold and to ensure sufficient rigidity to provide a self-supporting cast product.

Of particular significance in accordance with the invention is the arresting of crystallization of the molten material by such cooling to a temperature at which the amorphous material becomes extremely viscous or almost solidified. This prevents the formation of large crystals of non-uniform size which would otherwise occur to produce what is known as devitrification, a crystallizing action which is not readily controlled and which yields crystals of a type and arrangement which are not desired for the purposes of the present invention.

With the cast material thus cooled, the melted amorphous article is removed from the mold, placed in an annealing furnace at 700° C., and retained therein for a sufficient period of time for the entire structure to attain the furnace temperature. At this stage the molded product is an amorphous, vitreous material having no crystals therein. The article is then heated up to about 850° C. and held at this temperature for the purpose of initiating the auto-crystallization process. The article is maintained at this temperature for a sufficient period, e.g., 15 minutes to 2½ hours, with ½ to 1 hour being optimum, in order to produce a support skeleton of crystals in the product to ensure that it is self-supporting before the temperature is raised to the optimum crystallization level. As soon as this result is obtained, the temperature is raised to about 1050° C. and held for about 1 to 8 hours, with 4 hours being the optimum time. These conditions are optimum for inducing the growth of crystals of the desired form and orientation. Thereafter the product is gradually cooled to room temperature.

If desired, during the initial cooling step, the product may be cooled to room temperature for the purpose of inspection to determine whether the amorphous glassy phase of the molded article has any defects. After this procedure, the article may be subjected to the heating temperatures described above to initiate and complete the auto-crystallization process.

As will be understood, the particular temperatures and other values set forth may be different from those stated depending on the particular composition employed, since different compositions may be characterized by different annealing, melting, and initial and optimum crystallization temperatures.

As a result of the described process there is obtained a hard, dense, crystalline ceramic-like body of excellent electrical and mechanical properties wherein the metal hardware and ceramic material are joined in a strong, fluid-tight ceramic to metal seal.

The invention thus provides a novel ceramic product and method of making the same which affords numerous advantages over the prior known ceramic materials and processes. For example, as compared to porcelain, more precise dimensional tolerances are obtainable in the final product due to less shrinkage during the processing, the material is easier to work, shorter and more efficient manufacturing cycles are made possible, better hermetic seals with metal parts are achieved, the ceramic product can be reused even if broken, and, in general, lower cost components are employed.

Although the described material is particularly adapted for simple casting procedures, it may, after being poured in molten form into a mold, be subjected to pressing operations to achieve more sharply defined configurations. It is not, however, necessary to employ high pressures to achieve coherence or high density of the mass, as in the case of porcelain and other ceramics.

The described material has also been found useful as a bonding agent, as for example for such materials as alumina, magnesia, silicon carbide, mica isomorphs, and the like, and affords thereby improved electrical properties for such bodies as compared to glass-bonded or porcelain-bonded materials.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A hard, dense, mechanically strong electrically insulating ceramic material formed of a substantially homogeneous microcrystalline mass composed essentially of synthetic barium-containing crystals, said material having the following approximate composition in percent by weight:

| | Percent |
|---|---|
| MgO | 3–35 |
| $SiO_2$ | 25–50 |
| BaO | 3–35 |
| Fluxing agent | 10–35 | said fluxing agent being selected from the group consisting of $MgF_2$, $B_2O_3$, $Al_2O_3$, $Li_2O$, $Na_2O$, $K_2O$, $K_2SiF_6$, and $Al_2(SiF_6)_3$ and combinations thereof.

2. The method of making a hard, dense, mechanically strong, electrically insulating ceramic material which comprises forming a melt of a material having the following approximate composition in percent by weight:

| | Percent |
|---|---|
| MgO | 3–35 |
| BaO | 3–35 |
| $SiO_2$ | 25–50 |
| Fluxing agent | 10–35 | said fluxing agent being selected from the group consisting of $MgF_2$, $B_2O_3$, $Al_2O_3$, $Li_2O$, $Na_2O$, $K_2O$, $K_2SiF_6$, and $Al_2(SiF_6)_3$, and combinations thereof, cooling said melt to a temperature not higher than about the annealing temperature thereof to arrest the formation of crystals therein and forming thereby an amorphous, vitreous material heating the thus formed vitreous material to a temperature of about 800–950° C. for a period sufficient to initiate crystallization of said material, and thereafter heating the material to about 1050° C. for converting the same to a micro-crystalline ceramic body composed essentially of randomly oriented synthetic barium-containing crystals.

3. The method of making a hard, dense, mechanically strong, electrically insulating ceramic material which comprises forming a melt of a material having the following approximate composition in percent by weight:

| | Percent |
|---|---|
| MgO | 3–35 |
| BaO | 3–35 |
| $SiO_2$ | 20–50 |
| Fluxing agent | 10–35 | said fluxing agent being selected from the group consisting of $MgF_2$, $B_2O_3$, $Al_2O_3$, $Li_2O$, $Na_2O$, $K_2O$, $K_2SiF_6$, and $Al_2(SiF_6)_3$, and combinations thereof, casting said melt into a mold of predetermined configuration, cooling the melt in said mold to a temperature not higher than about the annealing temperature of the melt to arrest the formation of crystals therein and forming thereby an amorphous, vitreous material having said predetermined configuration, removing said material from the mold, heating the thus-formed vitreous material to about 800–950° C. for a period sufficient to initiate crystallization of said material, and thereafter heating the material to about 1050° C. for converting the same to a microcrystalline ceramic body composed essentially of synthetic barium-containing crystals.

4. The method of making a hard, dense, mechanically strong, electrically insulating ceramic material which comprises forming a melt of a material having the following approximate composition in percent by weight:

| | Percent |
|---|---|
| MgO | 3–35 |
| BaO | 3–35 |
| $SiO_2$ | 25–50 |
| Fluxing agent | 10–35 | said fluxing agent being selected from the group consisting of $MgF_2$, $B_2O_3$, $Al_2O_3$, $Li_2O$, $Na_2O$, $K_2O$, $K_2SiF_6$, and $Al_2(SiF_6)_3$, and combinations thereof, casting said melt into a mold having metal parts arranged therein for embedding in the cast product, cooling the melt in said mold to a temperature not higher than about the annealing temperature of the melt to arrest the formation of crystals therein and forming thereby an amorphous, vitreous material having a configuration imparted thereto by the mold and having embedded therein said metal parts, removing said material from the mold, heating the thus-formed vitreous material to about 800–950° C. for a period sufficient to initiate crystallization of said material, and thereafter heating the material to about 1050° C. for converting the same to a microcrystalline ceramic body composed essentially of synthetic barium-containing crystals.

References Cited in the file of this patent

UNITED STATES PATENTS

| | | |
|---|---|---|
| 1,333,400 | Fisk | Mar. 9, 1920 |
| 1,955,821 | McDougal | Apr. 24, 1934 |
| 1,973,408 | Curtis | Sept. 11, 1934 |
| 2,839,414 | Fenity et al. | June 17, 1958 |
| 2,876,120 | Machlan | Mar. 3, 1959 |
| 2,878,130 | Harman et al. | Mar. 17, 1959 |
| 2,920,971 | Stookey | Jan. 12, 1960 |